United States Patent
Gross et al.

(10) Patent No.: US 10,914,270 B2
(45) Date of Patent: Feb. 9, 2021

(54) MOTOR VEHICLE WITH LIQUID CONTAINER

(71) Applicant: MAGNA STEYR Fuel Systems GesmbH, Sinabelkirchen (AT)

(72) Inventors: Joerg Gross, Wesseling (DE); Kai Marek, Sebersdorf (AT); Bernd Kahler, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 16/574,385

(22) Filed: Sep. 18, 2019

(65) Prior Publication Data

US 2020/0116107 A1   Apr. 16, 2020

(30) Foreign Application Priority Data

Oct. 16, 2018   (AT) .................................. EP18200700

(51) Int. Cl.
| | |
|---|---|
| *F02M 25/022* | (2006.01) |
| *B60K 11/02* | (2006.01) |
| *F01P 5/12* | (2006.01) |
| *F01P 7/14* | (2006.01) |
| *F02M 25/028* | (2006.01) |
| *F01P 11/04* | (2006.01) |

(52) U.S. Cl.
CPC ......... *F02M 25/0224* (2013.01); *B60K 11/02* (2013.01); *F01P 5/12* (2013.01); *F01P 7/14* (2013.01); *F01P 11/04* (2013.01); *F02M 25/028* (2013.01); *F02M 25/0222* (2013.01); *F02M 25/0227* (2013.01); *F01P 2005/125* (2013.01); *F01P 2007/146* (2013.01)

(58) Field of Classification Search
CPC ..... F01P 5/12; F01P 7/14; F01P 11/04; B60K 11/02; F02M 25/0222; F02M 25/0227; F02M 25/028
See application file for complete search history.

(56) References Cited

U.S. PATENT DOCUMENTS

| | | | | |
|---|---|---|---|---|
| 2006/0112695 A1* | 6/2006 | Neubauer | ................ | B60K 6/32 60/714 |
| 2009/0320503 A1* | 12/2009 | Kamiya | .................... | F02G 5/04 62/79 |
| 2015/0240448 A1 | 8/2015 | Mori et al. | | |

FOREIGN PATENT DOCUMENTS

| | | |
|---|---|---|
| DE | 3818621 A1 | 12/1989 |
| JP | 2007113403 A | 5/2007 |

OTHER PUBLICATIONS

Extended European Search Report for European Patent Application No. 18200700.5, dated Oct. 16, 2018, 4 pages.

* cited by examiner

*Primary Examiner* — Kevin A Lathers
(74) *Attorney, Agent, or Firm* — Jordan IP Law, LLC; Todd A. Vaughn

(57) ABSTRACT

A motor vehicle includes a liquid container for receiving an operating liquid, a cooling circuit for cooling a drive motor of the motor vehicle via a cooling liquid circulating in the cooling circuit, at least one heating coil arranged in the liquid container, the heating coil being operatively attached to the cooling circuit so that the cooling liquid is to flow through the heating coil and thereby heat the operating liquid, and a connection line operatively attached to the cooling circuit to thereby form a secondary circuit through which the cooling liquid is to flow, wherein the heating coil is arranged in the secondary circuit.

19 Claims, 3 Drawing Sheets

MOTOR VEHICLE WITH LIQUID CONTAINER

CROSS-REFERENCE TO RELATED APPLICATIONS

The present application claims priority 35 U.S.C. § 119 to European Patent Publication No. EP 18200700.5 (filed on Oct. 16, 2018), which is hereby incorporated by reference in its entirety.

TECHNICAL FIELD

Embodiments relate to a motor vehicle comprising a liquid container for receiving an operating liquid and a method for heating an operating liquid in a liquid container of this kind.

BACKGROUND

Liquid containers are used for different purposes in motor vehicles, in order to store operating liquids which are necessary for operation of the motor vehicle.

More recently, for example, water has been used as an operating liquid in order to inject water into an intake duct of an internal combustion engine. Water injection enables knocking combustion to be avoided when an internal combustion engine is running at high engine load. The water may, for example, be injected into the combustion chamber of an engine as a petrol/water mixture or the water is injected straight into the combustion chamber via a water injector.

The problem is that water freezes at a temperature of only 0 degrees Celsius. Moreover, water injection systems for internal combustion engines require relatively large amounts of water per second, which means that correspondingly large amounts of water have to be made available in liquid form. For this reason, many containers for operating liquids such as water require a correspondingly efficient heating system so that the required amounts of liquid can be made available.

The customary use of electrical heating systems to heat operating liquids in liquid containers is therefore inadequate in many applications. Using waste heat from the motor vehicle's drive motor to heat the operating liquid is not available quickly enough to be able to provide the required operating liquid swiftly.

SUMMARY

A technical problem addressed by embodiments is that of specifying a motor vehicle comprising a fluid container for receiving an operating liquid, in particular water. For such a motor vehicle, freezing of the operating liquid, including at higher operating liquid throughputs, is to be prevented in an economic way. In particular, an operating liquid such as water should be capable of being thawed quickly and efficiently even at outside temperatures in the region of −20 degrees Celsius. A further problem addressed by embodiments is that of specifying an efficient method for heating an operating liquid in a liquid container of this kind.

The technical problem is solved by a motor vehicle comprising a liquid container for receiving an operating liquid, a drive motor of the motor vehicle, a cooling circuit for cooling the drive motor, wherein a cooling liquid is to circulate throughout the cooling circuit, and at least one heating coil arranged in the liquid container, the heating coil being attached to the cooling circuit in such a manner that the cooling liquid may flow through the heating coil in order to heat the operating liquid. In this case, a connection line according to embodiments is attached to the cooling circuit on two connection regions/sides, so that a smaller secondary circuit is created through which the cooling liquid flows, wherein the heating coil is arranged in the secondary circuit.

In accordance with embodiments, a cooling system, which is in any event present in a motor vehicle, is used for a drive motor of said motor vehicle in order to heat the operating liquid via the cooling liquid heated by the engine cooling system and to prevent freezing of the operating liquid. At least one, preferably a plurality, of heating coils are arranged in the liquid container for this purpose, i.e., to transfer heat from the cooling liquid to the surrounding medium, namely the operating liquid.

In accordance with embodiments, a connection line is attached to the cooling circuit on two connection regions/sides, so that a smaller, secondary circuit having a heating coil arranged therein is created through which the cooling liquid flows. The cooling circuit, therefore, is preferably selectively shortened, so that a smaller second cooling circuit, i.e., the secondary circuit, is created which can be conducted around the liquid container in a substantially more close-fitting manner. Components which are not needed to heat the liquid container or an excessively large amount of cooling liquid that has not yet been heated can thereby be separated from the circuit which is used to heat the liquid container. In this way, it is therefore possible for the medium of the cooling circuit to be used to heat the operating liquid via a heating coil without, however, the entire cooling circuit constantly having to be used. The medium in the secondary circuit and in the heating coils can therefore be separately heated more easily.

With an arrangement of this kind, it is possible for an operating liquid such as water to be thawed quickly and efficiently even at outside temperatures in the region of −20 degrees Celsius. In particular, in that only the secondary circuit is initially used for heating via heating coils and the remaining "normal" cooling circuit is separated. The device may be set up in such a manner that after roughly 5 minutes, a volume of at least 600 ml of liquid water is available for injection, and in the longer term, 12 litres of water per hour can be provided and made available in the liquid state.

Within the framework of embodiments, each connection element can be used as a connection line, even if said connection element scarcely has line-shaped or tubular portions, for example, a very short connection line such as in a connection valve.

In accordance with embodiments, the connection line may be arranged in the liquid container or also outside the liquid container, preferably, in the vicinity of the liquid container.

In accordance with embodiments, a pump is preferably arranged in the secondary circuit so that the cooling liquid is circulated within the secondary circuit. Via the pump, the cooling liquid can therefore be conveyed or circulated exclusively in the secondary circuit. The pump is preferably arranged in the connection line. The pump may be arranged in the liquid container or outside the liquid container, particularly in the vicinity of the liquid container, but in any event in the secondary circuit.

In accordance with embodiments, at least one valve, in particular, a cut-off valve, is preferably arranged in the connection line so that the secondary circuit can be cut off by the valve while the cooling circuit is open/active. In this state, however, the cooling circuit may preferably be conducted through the heating coils.

In accordance with embodiments, at least one valve, in particular, a cut-off valve, is preferably arranged in the cooling circuit at a region outside of the secondary circuit so that the cooling circuit can be separated by the valve while the secondary circuit is open. In this state, the cooling liquid can preferably circulate through the secondary circuit, on the one hand, and on the other hand, separately from this, the cooling liquid can circulate through the cooling circuit. The cooling circuit can then be conducted via a further connection line, for example, which may likewise be attached to the cooling circuit on two connection regions/sides and which may be attached to the cooling circuit parallel to the connection line.

In accordance with embodiments, at least one electrical heating device is preferably arranged on the secondary circuit, in order to heat the cooling liquid in the secondary circuit. In addition to the heating of the cooling liquid via the waste heat from the drive motor, an electrical heating device is therefore provided so that the cooling liquid can likewise be heated. In particular, the cooling liquid in the secondary circuit can be heated by the electrical heating device and, if said secondary circuit is separated from the remaining cooling circuit, only the cooling liquid in the secondary circuit can be heated. Consequently, part of the cooling circuit can be used for heating the heating coil, and therefore the operating liquid, even without the use of the waste heat from the drive motor. The electrical heating device may also be used for additional heating, in addition to the heating by the drive motor.

In accordance with embodiments, the electrical heating device may be arranged in the liquid container or outside the liquid container, in particular in the vicinity of the liquid container.

In accordance with embodiments, the heating coil may be made of a smooth tube or a corrugated tube and the material of the heating coil is preferably a thermoplastic, a non-ferrous metal, aluminium, stainless steel or a composite material, for example plastic-coated aluminium.

In accordance with embodiments, a method for heating an operating liquid in a liquid container of a motor vehicle having features as described above in addition to a control unit, the method comprising activating, via the control unit, the secondary circuit when a predefined activation condition is identified, or, if said secondary circuit is already activated, leaving it activated. If a predefined deactivation condition is identified, the secondary circuit can be deactivated by the control unit or, if said secondary circuit is already deactivated, it can be left in the dactivated state.

In the method, activation of the secondary circuit preferably involves the pump and the heating device being switched on. Activation of the secondary circuit may also involve a cut-off valve in the secondary circuit being opened and/or a cut-off valve in the cooling circuit outside the secondary circuit being closed, in particular a cut-off valve between the connection line and the other connection line.

In the method, deactivation of the secondary circuit preferably involves the pump and the heating device being switched off. Deactivation of the secondary circuit may also involve a cut-off valve in the secondary circuit being closed and/or a cut-off valve in the cooling circuit outside the secondary circuit being opened, in particular a cut-off valve between the connection line and the other connection line, so that the cooling liquid in the cooling circuit also circulates through the heating coils.

In accordance with embodiments, the predefined activation condition preferably comprises a predefined low threshold value of the engine temperature and/or of the outside temperature. The predefined deactivation condition preferably comprises a predefined high threshold value of the engine temperature and/or of the outside temperature. Consequently, the secondary circuit can be blocked by the control unit when a predetermined engine temperature is identified, in that the pump and the electrical heating device are switched off. In this state, heating of the operating fluid only takes place via the normal cooling circuit, and therefore, substantially via waste heat from the drive motor. If the drive motor is not at a sufficient temperature, for example, when the motor vehicle is being started, the secondary circuit can be activated, in particular the pump and the electrical heating device switched on. The remaining cooling circuit may be separated via valves and circulate separately from the secondary circuit.

DRAWINGS

Embodiments will be illustrated by way of example in the drawings and explained in the description hereinbelow.

DESCRIPTION

Figure 1:
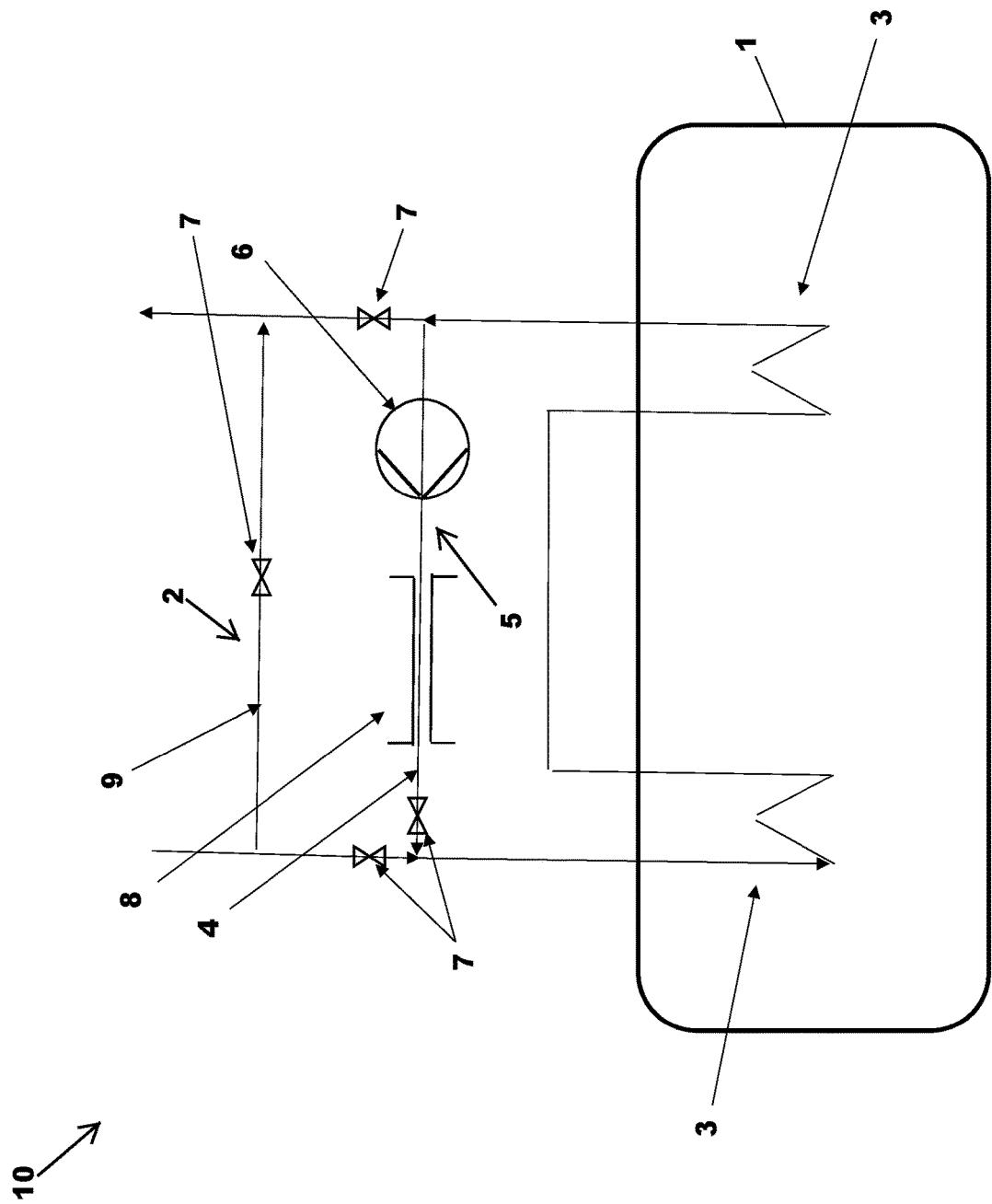
FIG. 1 illustrates a schematic representation of the region around the liquid container of a motor vehicle, in accordance with a first embodiment.

As illustrated in FIG. 1, a motor vehicle 10 in accordance with embodiments, comprises a liquid container 1 for receiving an operating liquid. A drive motor of the motor vehicle is cooled by a cooling circuit 2, for which purpose a cooling liquid is to circulates in the cooling circuit 2. Heating coils 3 which are operatively attached to the cooling circuit 2 are arranged in the liquid container 1, so that cooling liquid also flows through the heating coils 3. In that way, an operating liquid in the liquid container 1 is heated by the heating coils 3 in order to thaw said operating liquid, for example.

In accordance with embodiments, the heating coils 3 are made of a smooth pipe or a corrugated pipe, for example a thermoplastic, aluminum or stainless steel or a composite material, for example plastic-coated aluminum.

A connection line 4 is attached to the cooling circuit 2 at two connection regions/sides, so that a smaller secondary circuit 5 is formed which has cooling liquid flowing through it. In accordance with embodiments, the heating coils 3 are arranged in the secondary circuit 5.

In accordance with the embodiment illustrated in FIG. 1, the connection line 4 is arranged outside the liquid container 1.

In accordance with illustrated embodiment of FIG. 1, the connection line 4 is a short line which is used to shorten the cooling circuit 2. A line, for example, which comprises the heating coils 3 and which is attached to a closed cooling circuit 2 at two connection regions/sides may also be used as the connection line.

A secondary connection line 9 is attached to the cooling circuit 2 on two connection regions/sides, the secondary connection line 9 being arranged in parallel to the connection line 4.

A pump 6 is arranged in the secondary circuit 5, namely in the connection line 4, in order to circulate the cooling liquid within the secondary circuit 5. The pump 6 is therefore likewise arranged outside of the liquid container 1 but in the vicinity of said liquid container 1, so that a relatively small secondary circuit 5 can be operated to heat the liquid container 1.

A plurality of valves 7, in particular cut-off valves, are provided, and include a valve 7 arranged in the connection line 4, valves 7 arranged in the cooling circuit 2 outside of the secondary circuit 5 (between the connection line 4 and the secondary connection line 9), and a valve 7 arranged in the secondary connection line 9.

The secondary circuit 5 can be optionally closed via the valves 7 while the cooling circuit 2 remains open and optionally runs via the secondary connection line 9 or via the heating coils 3 of the secondary circuit 5.

The cooling circuit 2 can also be separated from the secondary circuit 5 via the valves 7, so that the cooling liquid runs back via the secondary connection line 9, while the secondary circuit 5 remains open and circulates in a self-contained manner.

An electrical heating device 8 is arranged on the secondary circuit 5 in order to heat the cooling liquid in said secondary circuit 5. The electrical heating device 8 is arranged on the connection line 4, in order to heat the connection line 4 and therefore, the cooling liquid that flows through the connection line 4. The electrical heating device 8 is therefore arranged outside the liquid container 1 in the vicinity of the liquid container 1.

Figure 2:
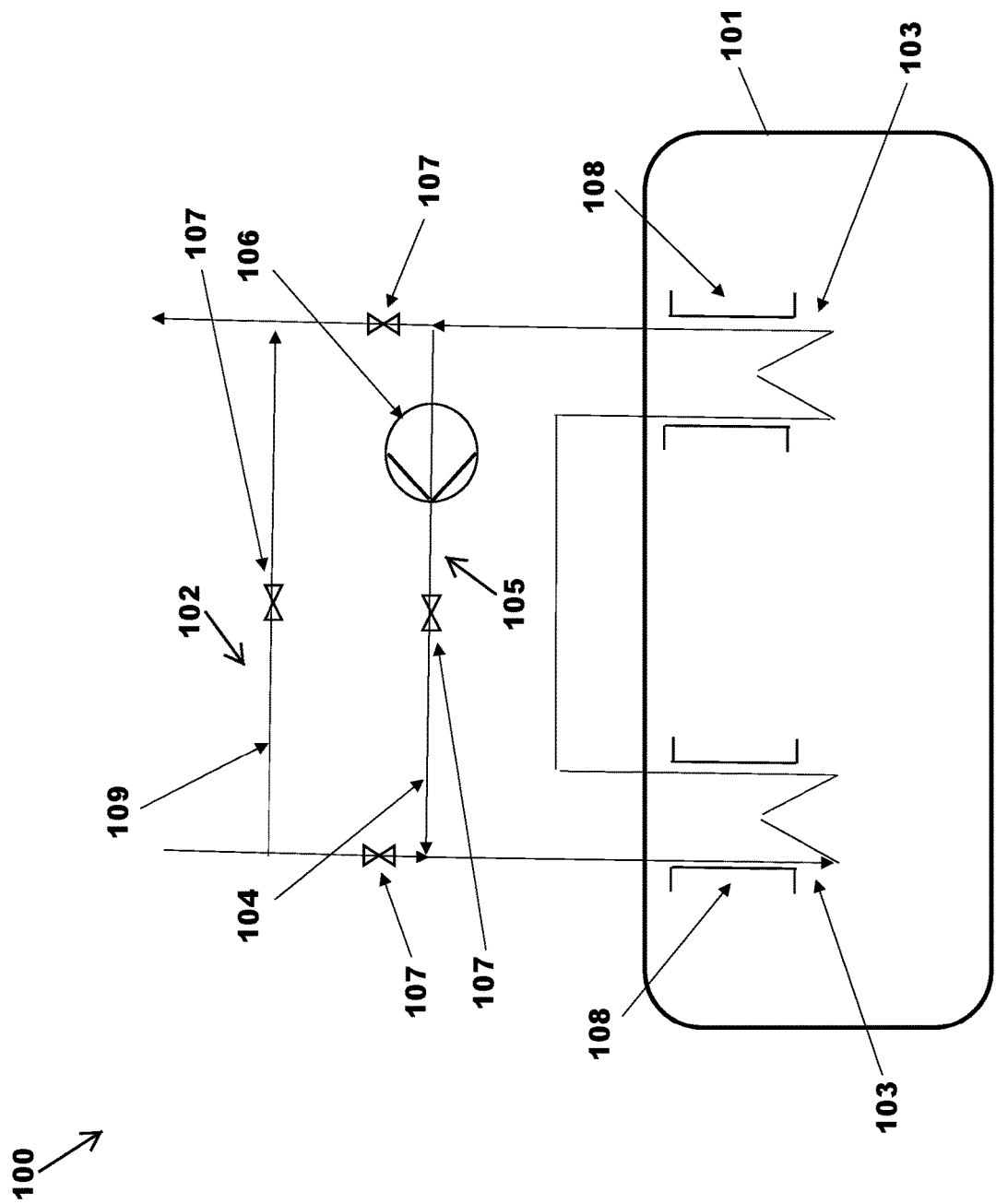
FIG. 2 illustrates a schematic representation of the region around the liquid container of a motor vehicle, in accordance with another embodiment.

As illustrated in FIG. 2, a motor vehicle 100 in accordance with embodiments comprises a liquid container 101 for receiving an operating liquid. A drive motor of the motor vehicle is cooled by a cooling circuit 102, for which purpose a cooling liquid is to circulates in the cooling circuit 102. Heating coils 103 which are operatively attached to the cooling circuit 102 are arranged in the liquid container 101, so that cooling liquid also flows through the heating coils 103. In that way, an operating liquid in the liquid container 101 is heated by the heating coils 103 in order to thaw said operating liquid, for example.

In accordance with embodiments, the heating coils 103 are made of a smooth pipe or a corrugated pipe, for example a thermoplastic, aluminum or stainless steel or a composite material, for example plastic-coated aluminum.

A connection line 104 is attached to the cooling circuit 102 at two connection regions/sides, so that a smaller secondary circuit 105 is formed which has cooling liquid flowing through it. In accordance with embodiments, the heating coils 103 are arranged in the secondary circuit 105.

In accordance with the embodiment illustrated in FIG. 2, the connection line 104 is arranged outside the liquid container 101.

In accordance with embodiment illustrated in FIG. 2, the connection line 104 is a short line which is used to shorten the cooling circuit 102. A line, for example, which comprises the heating coils 103 and which is attached to a closed cooling circuit 102 at two connection regions/sides may also be used as the connection line.

A secondary connection line 109 is attached to the cooling circuit 102 on two connection regions/sides, the secondary connection line 109 being arranged in parallel to the connection line 104.

A pump 106 is arranged in the secondary circuit 105, namely in the connection line 104, in order to circulate the cooling liquid within the secondary circuit 105. The pump 106 is therefore likewise arranged outside of the liquid container 101 but in the vicinity of said liquid container 101, so that a relatively small secondary circuit 105 can be operated to heat the liquid container 101.

A plurality of valves 107, in particular cut-off valves, are provided, and include a valve 107 arranged in the connection line 104, valves 107 arranged in the cooling circuit 102 outside of the secondary circuit 105 (between the connection line 104 and the secondary connection line 109), and a valve 107 arranged in the secondary connection line 109.

The secondary circuit 105 can be optionally closed via the valves 107 while the cooling circuit 102 remains open and optionally runs via the secondary connection line 109 or via the heating coils 103 of the secondary circuit 105.

The cooling circuit 102 can also be separated from the secondary circuit 105 via the valves 107, so that the cooling liquid runs back via the secondary connection line 109, while the secondary circuit 105 remains open and circulates in a self-contained manner.

An electrical heating device 108 is arranged in the liquid container. Accordingly, the illustrated motor vehicle 100 differs from the embodiment illustrated in FIG. 1 in that the electrical heating device 108 is arranged in the liquid container 101. The electrical heating device 108 is to directly heat the lines of the secondary circuit 105 in the immediate vicinity of the heating coils 103 and/or in the region of the heating coils 103.

Figure 3:
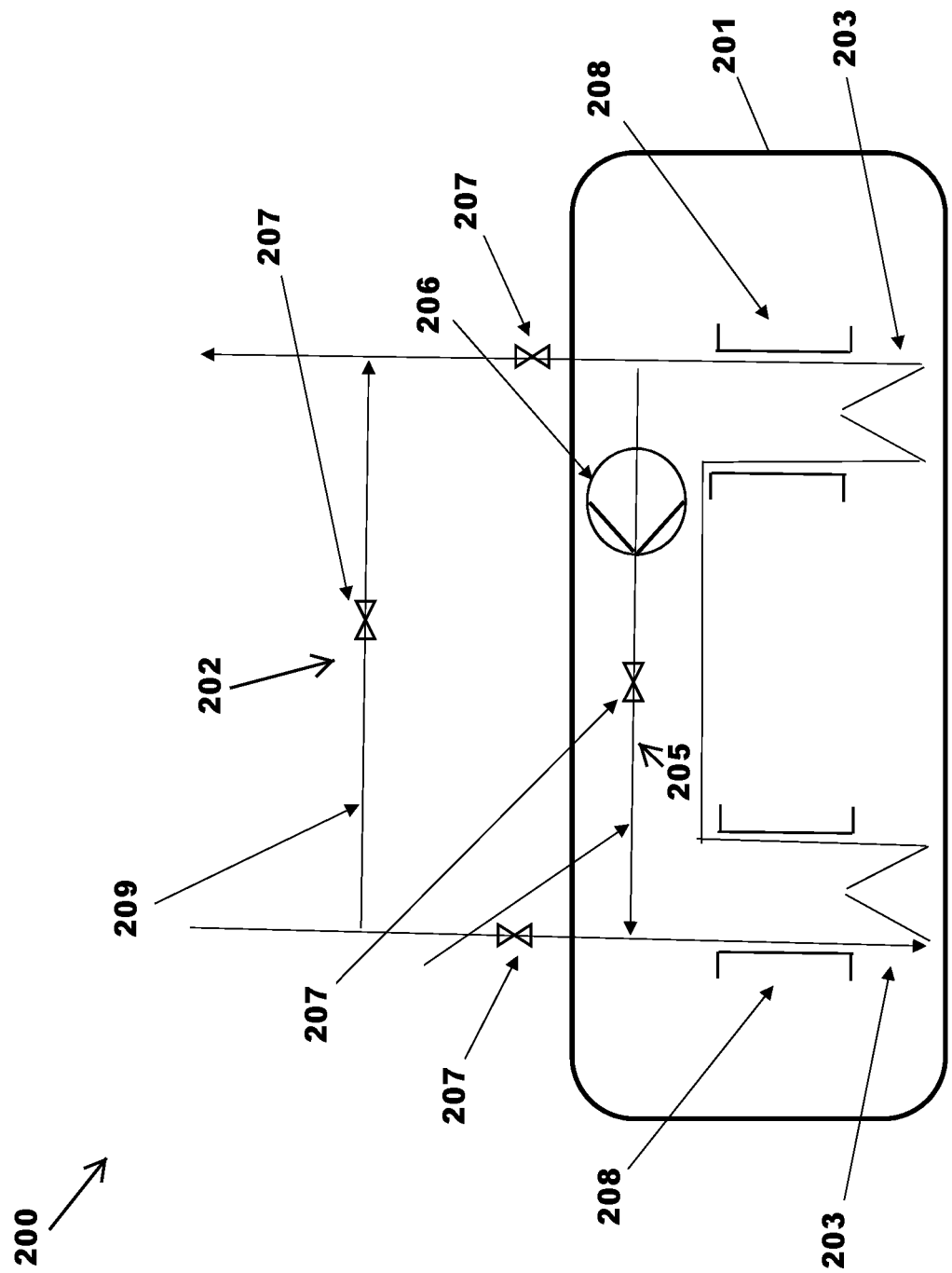
FIG. 3 illustrates a schematic representation of the region around the liquid container of a motor vehicle, in accordance with a further embodiment.

As illustrated in FIG. 3, a motor vehicle 200 in accordance with embodiments comprises a liquid container 201 for receiving an operating liquid. A drive motor of the motor vehicle is cooled by a cooling circuit 202, for which purpose a cooling liquid is to circulates in the cooling circuit 202. Heating coils 203 which are operatively attached to the cooling circuit 202 are arranged in the liquid container 201, so that cooling liquid also flows through the heating coils 203. In that way, an operating liquid in the liquid container 201 is heated by the heating coils 203 in order to thaw said operating liquid, for example.

In accordance with embodiments, the heating coils 203 are made of a smooth pipe or a corrugated pipe, for example a thermoplastic, aluminum or stainless steel or a composite material, for example plastic-coated aluminum.

A connection line 204 is attached to the cooling circuit 202 at two connection regions/sides, so that a smaller secondary circuit 205 is formed which has cooling liquid flowing through it. In accordance with embodiments, the heating coils 203 are arranged in the secondary circuit 205.

In accordance with the embodiment illustrated in FIG. 3, the connection line 204 arranged in the liquid container 201 along with a pump 206. A secondary connection line 209 in this case remains outside of the liquid container 201 in order that the secondary circuit 205 can operate completely within the liquid container 201 and the cooling circuit 202 can operate completely outside of the liquid container 201.

The electrical heating device 208 is likewise arranged in the liquid container 201 where it acts directly on the heating coils 203 or the lines of the secondary circuit 205 in the vicinity of the heating coils 203, in any event, entirely within the liquid container 201.

In accordance with embodiment illustrated in FIG. 2, the connection line 204 is a short line which is used to shorten the cooling circuit 202. A line, for example, which comprises the heating coils 203 and which is attached to a closed cooling circuit 202 at two connection regions/sides may also be used as the connection line.

The secondary connection line 209 is attached to the cooling circuit 202 on two connection regions/sides, the secondary connection line 209 being arranged in parallel to the connection line 204.

The pump 206 is arranged in the secondary circuit 205, namely in the connection line 204, in order to circulate the cooling liquid within the secondary circuit 205. The pump 206 is therefore likewise arranged in the liquid container 201, so that a relatively small secondary circuit 205 can be operated to heat the liquid container 201.

A plurality of valves 207, in particular cut-off valves, are provided, and include a valve 207 arranged in the connection line 204, valves 207 arranged in the cooling circuit 202 outside of the secondary circuit 205 (between the connection line 204 and the secondary connection line 209), and a valve 207 arranged in the secondary connection line 209.

The secondary circuit 205 can be optionally closed via the valves 207 while the cooling circuit 202 remains open and optionally runs via the secondary connection line 209 or via the heating coils 203 of the secondary circuit 205.

The cooling circuit 202 can also be separated from the secondary circuit 205 via the valves 207, so that the cooling liquid runs back via the secondary connection line 209, while the secondary circuit 205 remains open and circulates in a self-contained manner.

During operation of the motor vehicle 10, 100, 200, an arrangement may be implemented in such a manner that after the drive motor of the motor vehicle 10, 100, 200 has been started, the pump 6, 106, 206 is initially activated so that the cooling liquid in the small secondary circuit 5, 105, 205 only circulates in the vicinity of the liquid container 1, 101, 201. In addition, the electrical heating device 8, 108, 208 is activated so that the medium in the secondary circuit 5, 105, 205 and in the heating coils 3, 103, 203, namely the cooling liquid once again, is heated. Separately from the secondary circuit 5, 105, 205, cooling liquid can circulate in the "normal" or primary cooling circuit 2, 102, 202, in particular, via the secondary connection line 9, 109, 209. The valves 7, 107, 207 between the connection line 4, 104, 204 and the secondary line 9, 109, 209 are closed in this case, the valves 7, 107, 207 in the connection line 4, 104, 204 and in the secondary connection line 9, 109, 209 are open.

Once a predefined engine temperature has been reached, for example, a customary engine temperature for operation of the motor vehicle, the small heating circuit, namely the secondary circuit 5, 105, 205, is stopped. The electrical pump 6, 106, 206 and the electrical heating device 8, 108, 208 are switched off. Instead of this, the cooling liquid heated by the drive motor is used as a heating medium which, particularly without further heating by the electrical heating device 8, 108, 208, is conducted through the heating coils in the liquid container 1, 101, 201. The valves 7, 107, 207 between the connection line 4 and the other connection line 9, 109, 209 are opened in this case; the valves 7, 107, 207 in the connection line 4 and in the secondary connection line 9, 109, 209 can be closed.

The terms "coupled," "connected" "fastened" or "attached" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1, 101, 201 liquid container
2, 102, 202 cooling circuit
3, 103, 203 heating coil
4, 104, 204 connection line
5, 105, 205 secondary circuit
6, 106, 206 pump
7, 107, 207 valve
8, 108, 208 electrical heating device
9, 109, 209 secondary connection line
10, 100, 200 motor vehicle

What is claimed is:

1. A motor vehicle, comprising:
   a liquid container for receiving an operating liquid;
   a cooling circuit for cooling a drive motor of the motor vehicle via a cooling liquid circulating in the cooling circuit;
   at least one heating coil arranged in the liquid container, the heating coil being operatively attached to the cooling circuit so that the cooling liquid is to flow through the heating coil and thereby heat the operating liquid;
   a connection line operatively attached to the cooling circuit to thereby form a secondary circuit through which the cooling liquid is to flow, wherein the heating coil is arranged in the secondary circuit; and
   at least one valve arranged in the connection line to cut off the secondary circuit from the cooling circuit while the cooling circuit is in an operating state, wherein the cooling circuit, in said operating state, is conducted through the at least one heating coil.

2. The motor vehicle of claim 1, wherein the connection line is arranged in the liquid container.

3. The motor vehicle of claim 1, wherein the connection line is arranged outside of the liquid container.

4. The motor vehicle of claim 1, further comprising a pump, arranged in the connection line, to circulate the cooling liquid within the secondary circuit.

5. The motor vehicle of claim 4, wherein the pump is arranged in the liquid container or that the pump is arranged outside the liquid container in the vicinity of the liquid container.

6. The motor vehicle of claim 4, wherein the pump is arranged outside of the liquid container.

7. The motor vehicle of claim 1, further comprising at least one valve, arranged in the cooling circuit, to fluidically separate the cooling circuit from the secondary circuit while the secondary circuit is in an operating state.

8. The motor vehicle of claim 1, further comprising at least one secondary connection line, arranged in parallel to the connection line and operatively attached to the cooling circuit.

9. The motor vehicle of claim 8, further comprising at least one valve, arranged in the at least one secondary connection line.

10. The motor vehicle of claim 1, further comprising at least one electrical heating device, arranged on the secondary circuit, to heat the cooling liquid in the secondary circuit.

11. The motor vehicle of claim 10, wherein the electrical heating device is arranged in the liquid container or that the electrical heating device is arranged outside the liquid container in the vicinity of the liquid container.

12. The motor vehicle of claim 10, wherein the electrical heating device is arranged outside of the liquid container.

13. The motor vehicle of claim 1, wherein the at least heating coil comprises a smooth tube or a corrugated tube that is composed of a thermoplastic material, or a non-ferrous metal material, or aluminum, or stainless steel, or a composite material.

14. A system for a motor vehicle, the system comprising:
a liquid container for receiving an operating liquid;
a cooling circuit for cooling a drive motor of the motor vehicle via a cooling liquid circulating in the cooling circuit;
at least one heating coil arranged in the liquid container, the heating coil being operatively attached to the cooling circuit so that the cooling liquid is to flow through the heating coil and thereby heat the operating liquid;
a connection line operatively attached to the cooling circuit to thereby form a secondary circuit through which the cooling liquid is to flow, wherein the heating coil is arranged in the secondary circuit; and
at least one valve arranged in the connection line to cut off the secondary circuit from the cooling circuit while the cooling circuit is in an operating state, wherein the cooling circuit, in said operating state, is conducted through the at least one heating coil.

15. The motor vehicle of claim 14, further comprising:
a pump, arranged in the connection line, to circulate the cooling liquid within the secondary circuit;
at least one secondary connection line, arranged in parallel to the connection line and operatively attached to the cooling circuit; and
at least one electrical heating device, arranged on the secondary circuit, to heat the cooling liquid in the secondary circuit.

16. The motor vehicle of claim 15, further comprising:
at least one valve, arranged in the connection line, to cut off the secondary circuit from the cooling circuit while the cooling circuit is in an operating state;
at least one second valve, arranged in the cooling circuit, to fluidically separate the cooling circuit from the secondary circuit while the secondary circuit is in an operating state; and
at least one third valve, arranged in the at least one secondary connection line.

17. A method for heating an operating liquid in a liquid container of a motor vehicle, the method comprising:
providing the motor vehicle with:
a liquid container for receiving an operating liquid;
a cooling circuit for cooling a drive motor of the motor vehicle via a cooling liquid circulating in the cooling circuit;
at least one heating coil arranged in the liquid container, the heating coil being operatively attached to the cooling circuit so that the cooling liquid is to flow through the heating coil and thereby heat the operating liquid;
a connection line operatively attached to the cooling circuit to thereby form a secondary circuit through which the cooling liquid is to flow, wherein the heating coil is arranged in the secondary circuit; and
at least one valve arranged in the connection line to cut off the secondary circuit from the cooling circuit while the cooling circuit is in an operating state, wherein the cooling circuit, in said operating state, is conducted through the at least one heating coil,
activating the secondary circuit or maintaining the secondary circuit in an active operating state, upon identifying a predefined activation condition; and/or
deactivating the secondary circuit or maintaining the secondary circuit in a deactive operating state, upon identifying a predefined deactivation condition.

18. The method of claim 17, wherein:
activation of the secondary circuit comprises activating a pump and deactivating an electrical heating device switched;
deactivation of the secondary circuit comprises deactivating the pump and the electrical heating device.

19. The method of claim 17, wherein:
the predefined activation condition comprises a predefined low threshold value of an engine temperature, and/or a predefined low threshold value of an outside temperature; and
the predefined deactivation condition comprises a predefined high threshold value of the engine temperature, and/or a predefined high threshold value of the outside temperature.

* * * * *